(12) United States Patent
Zähe

(10) Patent No.: US 10,662,979 B1
(45) Date of Patent: May 26, 2020

(54) PROPORTIONAL VALVE FOR FLUID FLOW CONTROL AND GENERATION OF LOAD-SENSE SIGNAL

(71) Applicant: Sun Hydraulics, LLC, Sarasota, FL (US)

(72) Inventor: Bernd Zähe, Sarasota, FL (US)

(73) Assignee: Sun Hydraulics, LLC, Sarasota, FL (US)

( * ) Notice: Subject to any disclaimer, the term of this patent is extended or adjusted under 35 U.S.C. 154(b) by 14 days.

(21) Appl. No.: 16/215,120

(22) Filed: Dec. 10, 2018

(51) Int. Cl.
*F15B 13/04* (2006.01)
*F15B 11/16* (2006.01)
*F16K 31/40* (2006.01)

(52) U.S. Cl.
CPC ........ *F15B 13/0402* (2013.01); *F15B 11/161* (2013.01); *F15B 13/0417* (2013.01); *F16K 31/408* (2013.01); *F15B 2211/20538* (2013.01); *F15B 2211/20553* (2013.01); *F15B 2211/329* (2013.01); *F15B 2211/4053* (2013.01); *F15B 2211/6355* (2013.01); *Y10T 137/86614* (2015.04)

(58) Field of Classification Search
CPC .............. F15B 13/0402; F15B 13/0417; F15B 2211/20538; F15B 2211/20553; F15B 2211/329; F15B 2211/4053; F15B 2211/6355; F15B 11/161; Y10T 137/86614; F16K 31/408
USPC .................................................. 137/625.64
See application file for complete search history.

(56) References Cited

U.S. PATENT DOCUMENTS

| 4,201,116 A | 5/1980 | Martin |
| 4,406,306 A * | 9/1983 | Kolze ...................... F16K 11/24 |
| | | 137/625.43 |
| 4,674,613 A * | 6/1987 | Sikorski ................ F16D 48/066 |
| | | 137/625.64 |

(Continued)

FOREIGN PATENT DOCUMENTS

| DE | 41 07 695 | 9/1992 |
| EP | 0 953 776 | 11/1999 |
| GB | 2 400 161 | 10/2004 |

OTHER PUBLICATIONS

International Search Report and Written Opinion prepared by the European Patent Office in International Application No. PCT/US2019/057532, dated Jan. 30, 2020.

*Primary Examiner* — William M McCalister
(74) *Attorney, Agent, or Firm* — McDonnell Boehnen Hulbert & Berghoff LLP

(57) ABSTRACT

An example valve includes: a piston movable between a neutral position and an actuated position, wherein in the neutral position: a second port of the valve is fluidly coupled to a first port, and a third port is fluidly decoupled from the second port; a solenoid actuator sleeve movable between an unactuated state and an actuated state, wherein in the actuated state, the solenoid actuator sleeve allows pilot fluid to apply a fluid force on a piston in a distal direction; a first feedback spring; and a second feedback spring disposed in series with the first feedback spring, wherein the first feedback spring and the second feedback spring cooperate to apply a biasing force in a proximal direction on the piston against the fluid force, wherein the piston is configured to move to the actuated position based on a relationship between the fluid force and the biasing force.

20 Claims, 6 Drawing Sheets

(56) References Cited

U.S. PATENT DOCUMENTS

| | | | | |
|---|---|---|---|---|
| 4,741,364 A * | 5/1988 | Stoss | F15B 13/0402 | 137/625.64 |
| 4,746,093 A * | 5/1988 | Scanderbeg | F15B 13/015 | 251/30.04 |
| 5,042,832 A * | 8/1991 | Takahashi | B60G 17/018 | 137/625.64 |
| 5,174,544 A * | 12/1992 | Emanie | F16K 31/408 | 137/493 |
| 5,381,823 A * | 1/1995 | DiBartolo | F16K 17/065 | 137/494 |
| 5,445,188 A * | 8/1995 | Bourkel | F15B 13/0402 | 137/625.63 |
| 6,220,288 B1 | 4/2001 | Sandau | | |
| 6,527,010 B1 * | 3/2003 | Watson | E21B 34/04 | 137/625.63 |
| 7,779,853 B2 * | 8/2010 | Reilly | F15B 13/0402 | 137/14 |
| 7,921,880 B2 | 4/2011 | Jackson et al. | | |
| 8,397,758 B2 * | 3/2013 | Hillesheim | G05D 16/2024 | 137/625.68 |
| 2003/0106588 A1 * | 6/2003 | Zahe | F16K 17/10 | 137/491 |
| 2004/0154672 A1 * | 8/2004 | Liberfarb | G05D 7/005 | 137/625.64 |
| 2005/0139273 A1 * | 6/2005 | Morselli | F16K 31/0613 | 137/625.64 |
| 2006/0201554 A1 * | 9/2006 | Prinsen | F16K 17/0433 | 137/491 |
| 2006/0266419 A1 * | 11/2006 | Krug-Kussius | F16K 17/105 | 137/491 |
| 2011/0083763 A1 * | 4/2011 | Jeon | F16K 17/105 | 137/625.64 |
| 2013/0255809 A1 | 10/2013 | Bruck et al. | | |
| 2014/0007964 A1 * | 1/2014 | Schulz | G05D 16/2013 | 137/625.64 |
| 2014/0034135 A1 * | 2/2014 | Beschorner | F15B 19/005 | 137/1 |

* cited by examiner

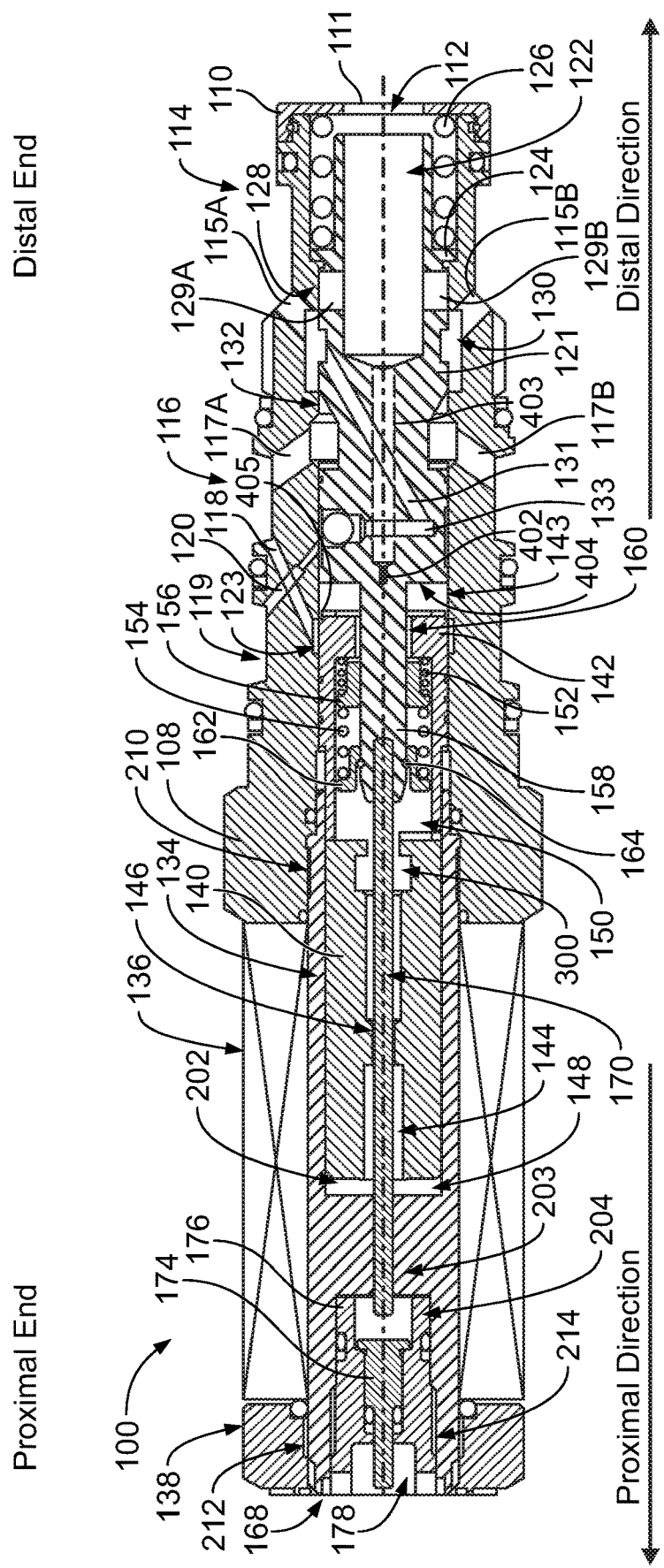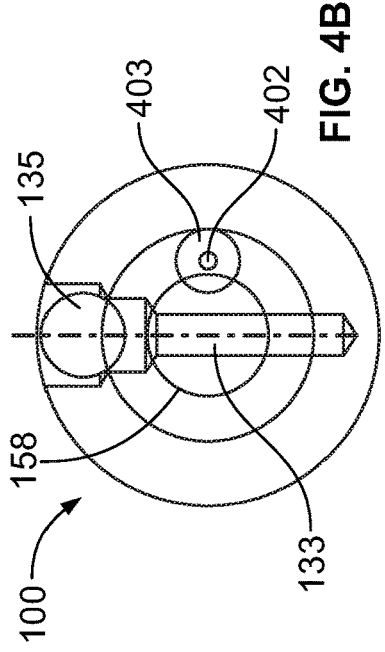

700

```
┌─────────────────────────────────────────────────────────────┐
│ OPERATING A VALVE IN A FIRST STATE, WHERE A FIRST PORT OF THE│
│ VALVE IS FLUIDLY COUPLED TO A SECOND PORT OF THE VALVE SUCH  │──702
│ THAT FLUID IS ALLOWED TO FLOW FROM THE SECOND PORT TO THE    │
│                        FIRST PORT                            │
└─────────────────────────────────────────────────────────────┘
                              │
                              ▼
┌─────────────────────────────────────────────────────────────┐
│ RECEIVING AN ELECTRIC SIGNAL ENERGIZING A SOLENOID COIL OF A │
│ SOLENOID ACTUATOR OF THE VALVE TO OPERATE THE VALVE IN A     │──704
│                       SECOND STATE                           │
└─────────────────────────────────────────────────────────────┘
                              │
                              ▼
┌─────────────────────────────────────────────────────────────┐
│ RESPONSIVELY, CAUSING AN ARMATURE AND A SOLENOID ACTUATOR    │
│ SLEEVE COUPLED THERETO TO MOVE, THEREBY (I) COMPRESSING A    │
│ FIRST FEEDBACK SPRING AND A SECOND FEEDBACK SPRING           │
│ DISPOSED IN SERIES WITH THE FIRST FEEDBACK SPRING TO INCREASE│
│ BIASING FORCE APPLIED BY THE FIRST FEEDBACK SPRING AND THE   │
│ SECOND FEEDBACK SPRING ON A PISTON OF THE VALVE IN A         │
│ PROXIMAL DIRECTION, AND (II) OPENING A PILOT FLOW PATH TO    │──706
│ ALLOW PILOT FLUID TO FLOW FROM A THIRD PORT OF THE VALVE TO  │
│ THE FIRST PORT, WHEREIN THE PILOT FLUID APPLIES A FLUID FORCE│
│ ON THE PISTON IN THE DISTAL DIRECTION, AND WHEREIN THE PISTON│
│ MOVES TO A PARTICULAR AXIAL POSITION DETERMINED BY A         │
│ RELATIONSHIP BETWEEN THE FLUID FORCE AND THE BIASING FORCE   │
└─────────────────────────────────────────────────────────────┘
                              │
                              ▼
┌─────────────────────────────────────────────────────────────┐
│ IN RESPONSE TO MOTION OF THE PISTON TO THE PARTICULAR AXIAL  │
│ POSITION: (I) OPENING A MAIN FLOW PATH FROM THE THIRD PORT TO│
│ THE SECOND PORT WHILE BLOCKING FLUID PATH FROM THE SECOND    │
│ PORT TO THE FIRST PORT, AND (II) OPENING A LOAD-SENSE PATH   │──708
│ FROM THE SECOND PORT TO A FOURTH PORT OF THE VALVE TO        │
│ PROVIDE A LOAD-SENSE SIGNAL THERETO                          │
└─────────────────────────────────────────────────────────────┘
```

FIG. 7

PROPORTIONAL VALVE FOR FLUID FLOW CONTROL AND GENERATION OF LOAD-SENSE SIGNAL

BACKGROUND

In conventional hydraulic systems, pressurized hydraulic fluid is supplied from a pump to a cylinder (actuator) and hydraulic fluid flows out of the actuator to a tank. The flow to the actuator and out of the actuator is controlled by a spool valve. The position of a spool within the spool valve controls the flow of the hydraulic fluid. When the spool valve is actuated, the spool moves to a certain position and controls the flow of hydraulic fluid both to and from the actuator.

The construction of the four way spool valve is such that a given position of the spool determines the 'flow in' and the 'flow out' restriction sizes. Thus, metering-in and metering-out are coupled, and a certain restriction size on the inlet corresponds to a certain restriction size on the outlet. Therefore, the valve has one degree of freedom, and can control either the speed of the actuator or the pressure in one chamber of the actuator but not both. Thus, a spool valve can provide for speed control but it cannot achieve energy saving potential at the same time.

Further, in the case of an overrunning load, which occurs when lowering a load with gravity assistance, for example, a spool valve is designed such that the outlet restriction is used to control the flow so as to prevent the load from falling at uncontrollable speeds. However, in other operating conditions, such as lifting a load, this restriction is not needed yet it is inherent in the design of the spool valve and causes energy loss.

Further, some spool valves are actuated via a pilot fluid signal. Particularly, a pressure reducing valve is added to the system and is configured to receive fluid from the pump and reduce the pressure level of the fluid before providing the pilot signal fluid having the reduced pressure level to the spool valve to move its spool. Having such a pressure reducing valve can increase the cost of the hydraulic system. Further, such a hydraulic system involves first reducing pressure level then controlling a stroke of the spool of the spool valve. Such configuration can lead to poor resolution and poor proportionality between a command signal to the pressure reducing valve and a position of the spool.

It may thus be desirable to have a hydraulic system that replaces the spool valve with two independently-controlled meter-in valves. It may also be desirable to have meter-in valves with a mechanical feedback to control stroke of a movable element rather than controlling pressure level. This way, the pressure reducing valve is eliminated from the system and enhanced flow resolution and proportionality can be achieved. It is with respect to these and other considerations that the disclosure made herein is presented.

SUMMARY

The present disclosure describes implementations that relate to a proportional valve for fluid flow control and generation of load-sense signal.

In a first example implementation, the present disclosure describes a valve. The valve includes: (i) a housing comprising: (a) a first port, (b) a second port, (c) a third port, wherein the third port comprises a pilot cross-hole and an inlet flow cross-hole, and (d) a fourth port; (ii) a piston disposed in the housing and axially movable between a neutral position and an actuated position, wherein the piston is configured to allow a load-sense (LS) fluid signal to be provided from the second port to the fourth port through the piston, and wherein in the neutral position: (a) the second port is fluidly coupled to the first port, and (b) the inlet flow cross-hole of the third port is fluidly decoupled from the second port; (iii) a solenoid actuator sleeve comprising a chamber therein, wherein the solenoid actuator sleeve is axially movable between an unactuated state and an actuated state, wherein in the unactuated state, the solenoid actuator sleeve blocks the pilot cross-hole of the third port, and in the actuated state, the solenoid actuator sleeve is configured to allow the pilot cross-hole to be fluidly coupled to the first port and allow pilot fluid to apply a fluid force on the piston in a distal direction; (iv) a first feedback spring disposed in the chamber within the solenoid actuator sleeve; and (v) a second feedback spring disposed in series with the first feedback spring in the chamber within the solenoid actuator sleeve, wherein the first feedback spring and the second feedback spring cooperate to apply a biasing force in a proximal direction on the piston against the fluid force, wherein the piston is configured to move axially to the actuated position based on a relationship between the fluid force and the biasing force, and wherein in the actuated position the inlet flow cross-hole is fluidly coupled to the second port whereas the second port is fluidly decoupled from the first port.

In a second example implementation, the present disclosure describes a hydraulic system including a load-sensing pump having a load-sense (LS) port and an outlet for providing fluid therefrom; a tank; an actuator; and a valve having (i) a first port fluidly coupled to the tank, (ii) a second port fluidly coupled to the actuator, (iii) a third port fluidly coupled to the outlet of the load-sensing pump, wherein the third port comprises a pilot cross-hole and an inlet flow cross-hole, and (iv) a fourth port fluidly coupled to the LS port of the load-sensing pump. The valve comprises: (i) a piston that is axially movable between a neutral position and an actuated position, wherein the piston is configured to allow a LS fluid signal to be provided from the second port to the fourth port through the piston, wherein in the neutral position: (a) the second port is fluidly coupled to the first port, and (b) the inlet flow cross-hole of the third port is fluidly decoupled from the second port; (ii) a solenoid actuator sleeve that is axially movable between an unactuated state and an actuated state, wherein in the unactuated state, the solenoid actuator sleeve blocks the pilot cross-hole of the third port, and in the actuated state, the solenoid actuator sleeve is configured to allow the pilot cross-hole to be fluidly coupled to the first port and allow pilot fluid to apply a fluid force on the piston in a distal direction; (iii) a first feedback spring; and (iv) a second feedback spring disposed in series with the first feedback spring, wherein the first feedback spring and the second feedback spring cooperate to apply a biasing force in a proximal direction on the piston against the fluid force, wherein the piston is configured to move axially to the actuated position based on a relationship between the fluid force and the biasing force, and wherein in the actuated position, the inlet flow cross-hole is fluidly coupled to the second port whereas the second port is fluidly decoupled from the first port.

In a third example implementation, the present disclosure describes a method. The method includes: (i) operating a valve in a first state, wherein a first port of the valve is fluidly coupled to a second port of the valve such that fluid is allowed to flow from the second port to the first port; (ii) receiving an electric signal energizing a solenoid coil of a solenoid actuator of the valve to operate the valve in a second state; (iii) responsively, causing an armature and a solenoid actuator sleeve coupled thereto to move, thereby (a) compressing a first feedback spring and a second feedback spring disposed in series with the first feedback spring to increase a biasing force applied by the first feedback spring and the second feedback spring on a piston of the valve in a proximal direction, and (b) opening a pilot flow path to allow pilot fluid to flow from a third port of the valve to the first port, wherein the pilot fluid applies a fluid force on the piston in a distal direction, and wherein the piston moves to a particular axial position determined by a relationship between the fluid force and the biasing force; and (iv) in response to motion of the piston to the particular axial position, (a) opening a main flow path from the third port to the second port while blocking fluid path from the second port to the first port, and (b) opening a load-sense path from the second port to a fourth port of the valve to provide a load-sense signal thereto.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 4A illustrates a cross-sectional side view of a valve in a first actuated state, in accordance with an example implementation.

FIG. 4B illustrates a partial cross-sectional back view of the valve shown in FIG. 1, in accordance with an example implementation.

FIG. 7 is a flowchart of a method for operating a valve, in accordance with an example implementation.

DETAILED DESCRIPTION

Figure 1:
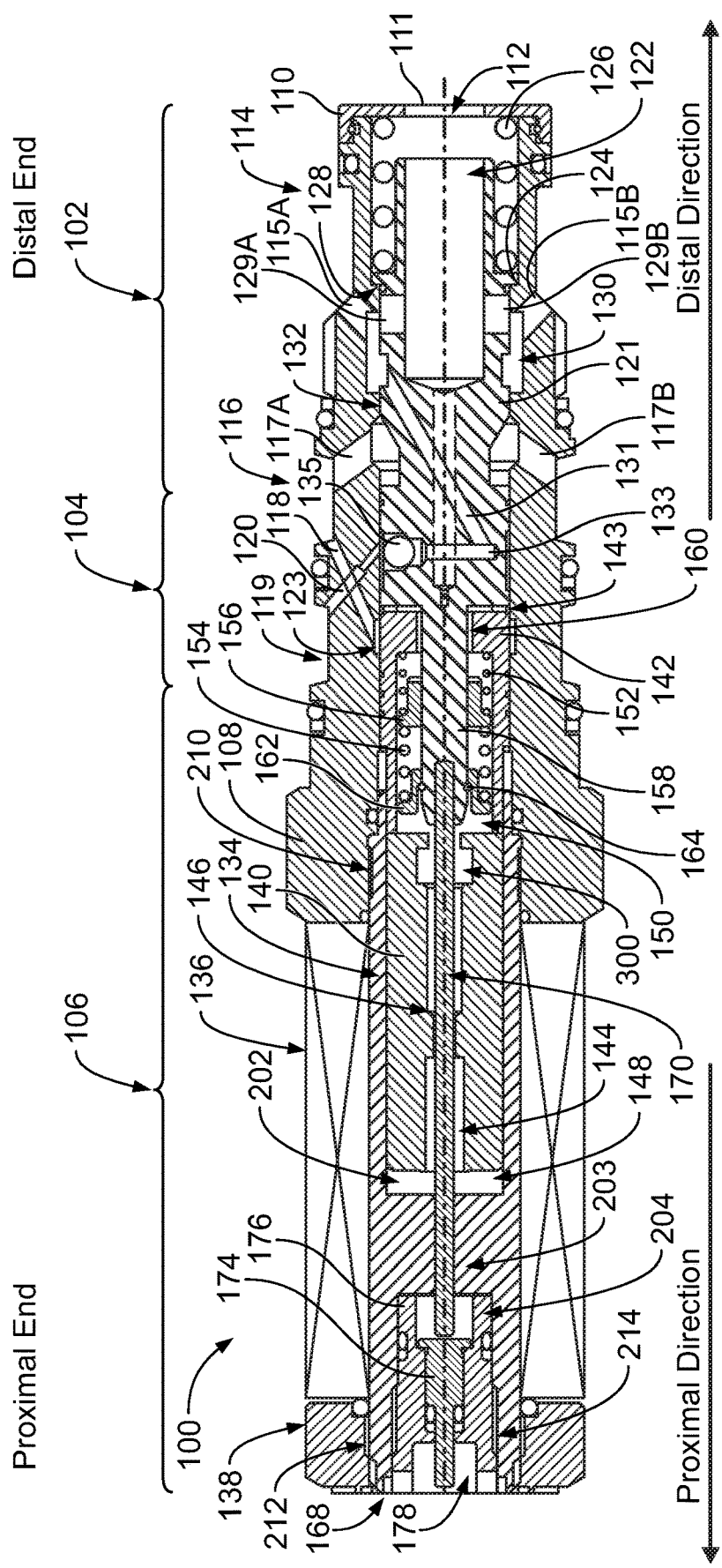
FIG. 1 illustrates a cross-sectional side view of a valve in an unactuated state, in accordance with an example implementation.

It may be desirable in hydraulic systems to independently control meter-in flow to an actuator and meter-out flow from the actuator. Independently controlling flow into and flow out of an actuator provides for a two degree of freedom system capable of controlling speed of the actuator as well as pressure in one of the chambers of the actuator, rendering the system capable of achieving a higher efficiency.

Further, in some conventional hydraulic systems where a spool valve is used to control both meter-in and meter-out flow, a pressure reducing valve is used in addition to the spool valve. The pressure reducing valve is configured to reduce pressure level of fluid received from a pump or other source of pressurized fluid, and then provides a pressure pilot fluid signal to the spool valve to move a spool within the spool valve. The pressure reducing valve adds to the cost of the hydraulic system. Further, such configuration having the pressure reducing valve involves controlling pressure level of the pilot signal to then control position of the spool. This configuration may lead to poor resolution and poor proportionality between a command signal to the pressure reducing valve and the position of the spool valve.

An actuator can have two chambers, each chamber having fluid at a respective pressure level. The higher pressure level of the respective pressure levels in the chambers can be indicative of the load that the actuator is subjected to. An example hydraulic system can include a load-sensing variable displacement pump as a source of fluid. The load-sensing variable displacement pump can be configured to receive a load-sense (LS) pressure signal indicative of the higher pressure level of the respective pressure levels in the chambers and provide a flow output that has a pressure level equal to the pressure level of the LS fluid signal plus a margin pressure setting so as to drive the actuator. In other words, output pressure level of the pump minus pressure level of the LS fluid signal is equal to the margin pressure setting. Particularly, the load-sensing variable displacement pump can be configured to add or subtract output flow to create the margin pressure setting in response to the pressure level of the LS fluid signal. It may be desirable to have a valve configured to internally generate the LS fluid signal so as to operate the pump, rather than having external hydraulic connections and shuttle valves provide the LS fluid signal to the pump.

Disclosed herein is a valve configured to control meter-in flow to an actuator. The disclosed valve can eliminate the pressure reducing valve used in conventional systems. Also, the disclosed valve operates based on a mechanical position feedback of a main movable element rather than based on controlling pressure level of a pilot signal. This way, enhanced position control can be achieved such that enhanced proportionality can be achieved between a command signal to the valve and flow rate of fluid through the valve. Two such valves can be used to independently control meter-in flow to respective two chambers of an actuator. One of the valves can be actuated while the other remains unactuated. The disclosed valve is configured such that, when actuated, it generates a LS fluid signal to drive a load-sensing variable displacement pump.

FIG. 1 illustrates a cross-sectional side view of a valve 100 in an unactuated state, in accordance with an example implementation. The valve 100 may be inserted or screwed into a manifold having ports corresponding to ports of the valve 100 described below. The manifold can thus fluidly couple the valve 100 to other components of a hydraulic system.

The valve 100 includes a main stage 102, a pilot stage 104, and a solenoid actuator 106. The valve 100 includes a housing 108 having a longitudinal cylindrical cavity therein. The housing 108 can also be referred to as a valve body or main sleeve of the valve 100. The longitudinal cylindrical cavity of the housing 108 is configured to house portions of the main stage 102, the pilot stage 104, and the solenoid actuator 106.

In examples, the valve 100 can include a nose piece 110 mounted at a distal end of the housing 108. The nose piece 110 can have a through-hole 111 to allow fluid communication therethrough.

The valve 100 includes a first port 112 defined at a nose or distal end of the housing 108. The first port 112 is aligned with the through-hole 111 of the nose piece 110. The first port 112 can also be referred to as a tank port and can be configured to be fluidly coupled to a tank or reservoir of hydraulic fluid.

The valve 100 also includes a second port 114. The second port 114 can include a set of cross-holes that can be referred to as actuator flow cross-holes, such as actuator flow cross-holes 115A, 115B, disposed in a radial array about the housing 108. The second port 114 can be referred to as operating or control port and can be configured to be fluidly coupled to a chamber of an actuator to provide fluid thereto.

The valve 100 can further include a third port 116. The third port 116 can be referred to as an inlet port and is configured to be coupled to a source of fluid (e.g., a pump, an accumulator, etc.). The third port 116 can include a first set of cross-holes that can be referred to as inlet flow cross-holes, such as inlet flow cross-holes 117A, 117B, disposed in a radial array about the housing 108. The third port 116 can further include a second set of cross-holes that can be referred to as pilot cross-holes, such as pilot cross-hole 118. The pilot cross-hole 118 fluidly couples the third port 116 to an annular groove 123 formed in the interior peripheral surface of the housing 108.

The valve 100 can further include a fourth port 119. The fourth port 119 can be referred to a load-sense (LS) port and is configured to be coupled to a LS port of a load-sensing variable displacement pump, for example. The fourth port 119 can include a set of cross-holes that can be referred to as LS cross-holes, such as LS cross-hole 120. As described below, the valve 100 is configured such that, when actuated, a pressure fluid signal is communicated from the second port 114 to the fourth port 119 so as to provide a LS fluid signal to a load-sensing variable displacement pump. The LS cross-hole 120 is isolated from (e.g., fluidly decoupled from and does not intersect with) the pilot cross-hole 118.

The valve 100 further includes a piston 121 that is disposed, and slidably accommodated, in the longitudinal cylindrical cavity of the housing 108. The term "piston" is used herein to encompass any type of movable element, such as a spool-type movable element or a poppet-type movable element. The piston 121 is shown in the figures as a spool-type movable element; however, it is contemplated that a poppet-type movable element can be used instead.

Further, the term "slidably accommodated" is used throughout herein to indicate that a first component (e.g., the piston 121) is positioned relative to a second component (e.g., the housing 108) with sufficient clearance therebetween, enabling movement of the first component relative to the second component in the proximal and distal directions. As such, the first component (e.g., piston 121) is not stationary, locked, or fixedly disposed in the valve 100, but is rather allowed to move relative to the second component (e.g., the housing 108).

The piston 121 has a cavity or main chamber 122 therein. The main chamber 122 is fluidly coupled to the first port 112. The piston 121 also includes an annular shoulder or protrusion 124 projecting from an exterior peripheral surface of the piston 121.

The valve 100 further includes a return spring 126 disposed about the exterior peripheral surface of the piston 121 between the protrusion 124 and the nose piece 110. Particularly, a distal end of the return spring 126 rests against the nose piece 110, whereas a proximal end of the return spring 126 rests against the protrusion 124. The nose piece 110 is fixed, and therefore the return spring 126 biases the piston 121 in the proximal direction to a neutral position shown in FIG. 1 where the protrusion 124 rests against a shoulder 128 projecting inward from an interior peripheral surface of the housing 108. The return spring 126 can be configured as a stiff spring. As an example for illustration, the return spring 126 can be configured to apply a force of between 20 pound-force (lbf) and 40 lbf on the piston 121.

The piston 121 further includes a set of cross-holes, such as piston cross-holes 129A, 129B, disposed in a radial array about the piston 121. In the neutral position shown in FIG. 1, the piston cross-holes 129A, 129B are aligned with or overlap with an annular groove 130 formed in the interior peripheral surface of the housing 108. The annular groove 130 is fluidly coupled to the actuator flow cross-holes 115A, 115B. As such, when the valve 100 is in the neutral position shown in FIG. 1, the second port 114 is fluidly coupled to the first port 112, and fluid received at the second port 114 (e.g., from a chamber of an actuator) can flow through the actuator flow cross-holes 115A, 115B and the annular groove 130, then through the piston cross-holes 129A, 129B to the main chamber 122, then to the first port 112, which can be fluidly coupled to a tank or reservoir. Thus, in the neutral position of FIG. 1, the fluid at the second port 114 is communicated to the first port 112, which can be coupled to a tank. The tank or reservoir can have fluid at a low pressure level, e.g., 0-70 pounds per square inch (psi).

As depicted in FIG. 1, the housing 108 has a protrusion 132 projecting inward from the interior peripheral surface of the housing 108. In the neutral position shown in FIG. 1, the protrusion 132 cooperates with an enlarged diameter section of the piston 121 to block fluid flow from the third port 116 to the second port 114. In other words, in the neutral position shown in FIG. 1, the third port 116 is fluidly decoupled from the second port 114.

The term "fluidly decoupled" is used herein to mean that no substantial fluid flow (e.g., except for minimal leakage flow of drops per minute) occurs between two ports. Similarly, the term "block" is used throughout herein to indicate substantially preventing fluid flow except for minimal or leakage flow of drops per minute, for example.

The piston 121 further includes one or more transverse channels such as a first transverse channel 131 and a second transverse channel 133 formed therein. The first transverse channel is slanted or disposed at an angle and is configured to fluidly couple the second port 114 (via the actuator flow cross-hole 115A and the annular groove 130) to the second transverse channel 133.

The valve 100 includes a check element 135, e.g., a check ball (a metal sphere), disposed at an end of the second transverse channel 133. Although a check ball is used herein for illustration of a check element, any other type of check element can be used instead of the check ball. For instance, a poppet or a combination of a pin and ball can be used. The check element 135 can preclude fluid flow from the fourth port 119 via the LS cross-hole 120 to the second transverse channel 133. However, if pressurized fluid is provided to the second port 114, the pressurized fluid can be communicated through the first transverse channel 131 and the second transverse channel 133, pushing the check element 135 and flowing around it, then through the LS cross-hole 120 to the fourth port 119.

The solenoid actuator 106 includes a solenoid tube 134 configured as a cylindrical housing or body disposed within and received at a proximal end of the housing 108, such that the solenoid tube 134 is coaxial with the housing 108. A solenoid coil 136 can be disposed about an exterior surface of the solenoid tube 134. The solenoid coil 136 is retained between a proximal end of the housing 108 and a coil nut 138 having internal threads that can engage a threaded region formed on the exterior peripheral surface of the solenoid tube 134 at its proximal end.

Figure 2:
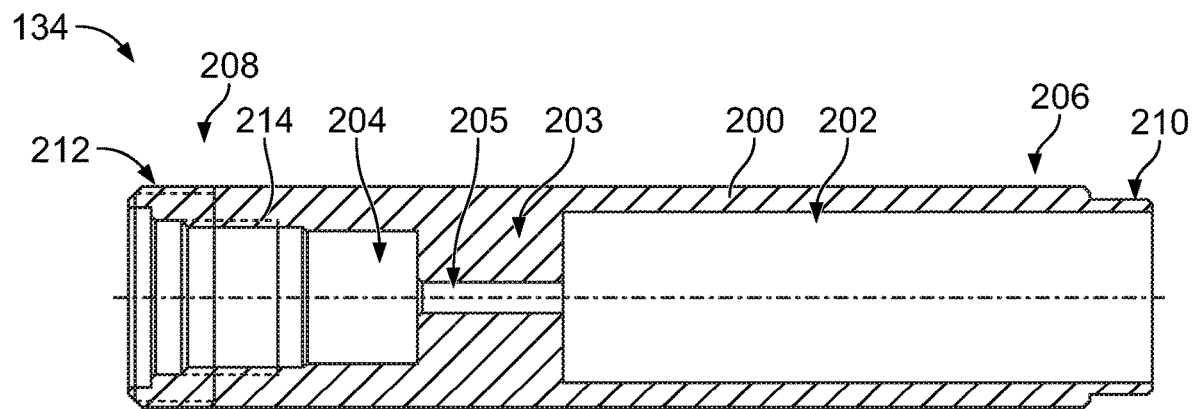
FIG. 2 illustrates a cross-sectional side view of a solenoid tube, in accordance with an example implementation.

FIG. 2 illustrates a cross-sectional side view of the solenoid tube 134, in accordance with an example implementation. As depicted, the solenoid tube 134 has a cylindrical body 200 having therein a first chamber 202 formed within a distal side of the cylindrical body 200 and a second chamber 204 formed within a proximal side of the cylindrical body 200. The solenoid tube 134 includes a pole piece 203 formed as a protrusion within the cylindrical body 200. The pole piece 203 separates the first chamber 202 from the second chamber 204. In other words, the pole piece 203 divides a hollow interior of the cylindrical body 200 into the first chamber 202 and the second chamber 204. The pole piece 203 can be composed of material of high magnetic permeability.

Further, the pole piece 203 defines a channel 205 therethrough. In other words, an interior peripheral surface of the solenoid tube 134 at or through the pole piece 203 forms the channel 205, which fluidly couples the first chamber 202 to the second chamber 204. As such, pressurized fluid provided to the first chamber 202 is communicated through the channel 205 to the second chamber 204.

In examples, the channel 205 can be configured to receive a pin therethrough so as to transfer linear motion of one component in the second chamber 204 to another component in the first chamber 202 and vice versa, as described below. As such, the channel 205 can include chamfered circumferential surfaces at its ends (e.g., an end leading into the first chamber 202 and another end leading into the second chamber 204) to facilitate insertion of such a pin therethrough.

The solenoid tube 134 has a distal end 206, which is configured to be coupled to the housing 108, and a proximal end 208. Particularly, the solenoid tube 134 can have a first threaded region 210 disposed on an exterior peripheral surface of the cylindrical body 200 at the distal end 206 that is configured to threadedly engage with corresponding threads formed in the interior peripheral surface of the housing 108.

Also, the solenoid tube 134 can have a second threaded region 212 disposed on the exterior peripheral surface of the cylindrical body 200 at the proximal end 208 and configured to be threadedly engaged with corresponding threads formed in the interior peripheral surface of the coil nut 138. Further, the solenoid tube 134 can have a third threaded region 214 disposed on an interior peripheral surface of the cylindrical body 200 at the proximal end 208 and configured to threadedly engage with corresponding threads formed in a component of a manual override actuator 168 as described below (see FIG. 1) or other components that can be inserted in the second chamber 204 such as a position sensor. The solenoid tube 134 can also have one or more shoulders formed in the interior peripheral surface of the cylindrical body 200 that can mate with respective shoulders of the manual override actuator 168 to enable alignment of the manual override actuator 168 (or other components) within the solenoid tube 134.

Referring back to FIG. 1, the solenoid tube 134 is configured to house an armature 140 in the first chamber 202. The armature 140 is slidably accommodated within the solenoid tube 134 (i.e., the armature 140 can move axially within the solenoid tube 134). The solenoid actuator 106 further includes a solenoid actuator sleeve 142 received at the proximal end of the housing 108 and disposed partially within a distal end of the solenoid tube 134.

The solenoid actuator sleeve 142 is shown in an unactuated state in FIG. 1 and is configured to move to an actuated state when the valve 100 is actuated (e.g., when the solenoid coil 136 is energized). Particularly, the armature 140 is mechanically coupled to, or linked with, the solenoid actuator sleeve 142. As such, if the armature 140 moves axially (e.g., in the proximal direction) when the solenoid coil 136 is energized, the solenoid actuator sleeve 142 moves along with the armature 140 in the same direction. The armature 140 can be coupled to the solenoid actuator sleeve 142 in several ways.

Figure 3:
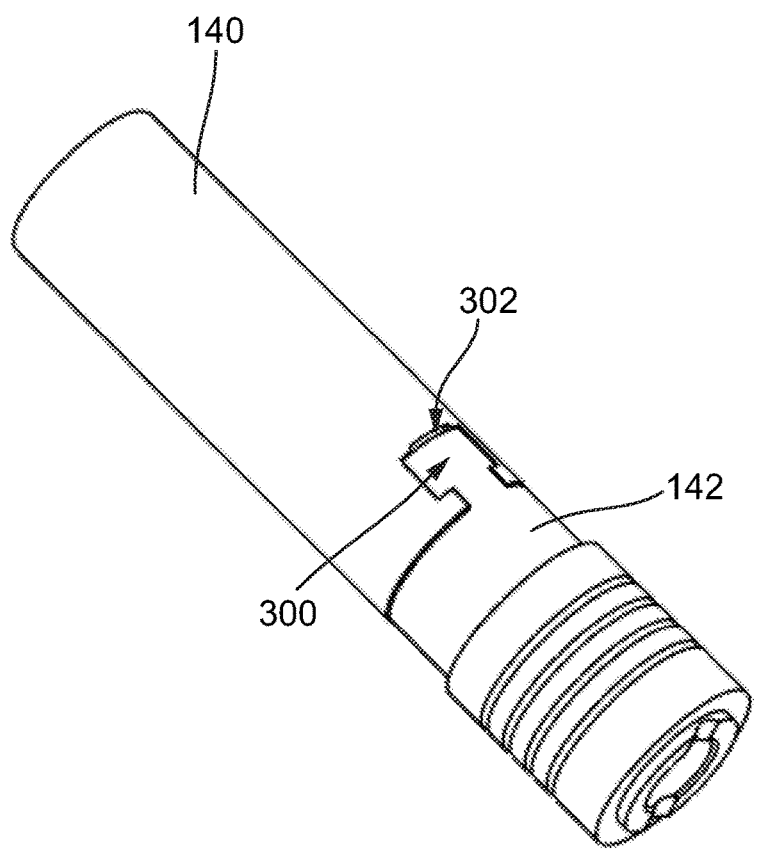
FIG. 3 illustrates a three-dimensional perspective view showing an armature coupled to a solenoid actuator sleeve, in accordance with another example implementation.

FIG. 3 illustrates a three-dimensional partial perspective view showing the armature 140 coupled to the solenoid actuator sleeve 142, in accordance with an example implementation. As shown, the solenoid actuator sleeve 142 can have a male T-shaped member 300, and the armature 140 can have a corresponding female T-slot 302 formed as an annular internal groove configured to receive the male T-shaped member 300 of the solenoid actuator sleeve 142. With this configuration, the armature 140 and the solenoid actuator sleeve 142 are coupled to each other such that if the armature 140 moves, the solenoid actuator sleeve 142 moves therewith.

Referring back to FIG. 1, the armature 140 includes a longitudinal channel 144 formed therein. The armature 140 further includes a protrusion 146 within the longitudinal channel 144. As mentioned above, the solenoid tube 134 includes the pole piece 203 formed as a protrusion within the cylindrical body 200. The pole piece 203 is separated from the armature 140 by an airgap 148 that varies in length based on axial position of the armature 140.

The solenoid actuator sleeve 142 has a hole 160 at its distal end. Further, the piston 121 has a proximal piston portion 158 that extends proximally through the hole 160 of the solenoid actuator sleeve 142.

The solenoid actuator sleeve 142 forms therein a chamber 150 configured to house a first feedback spring 152 and a second feedback spring 154 disposed in series with the first feedback spring 152. Particularly, the valve 100 includes a slidable spring cap 156 that is slidably accommodated about an exterior peripheral surface of the proximal piston portion 158 of the piston 121, where the proximal piston portion 158 extends within the chamber 150 through the hole 160 of the solenoid actuator sleeve 142. With this configuration, the first feedback spring 152 is disposed within the solenoid actuator sleeve 142 such that a distal end of the first feedback spring 152 interfaces with an interior surface of the solenoid actuator sleeve 142, and a proximal end of the first feedback spring 152 rests against the slidable spring cap 156.

The valve 100 further includes a proximal spring cap 162 disposed in the chamber 150 within the solenoid actuator sleeve 142. A distal end of the second feedback spring 154 interfaces with the slidable spring cap 156, whereas a proximal end of the second feedback spring 154 rests against the proximal spring cap 162.

The valve 100 further includes a wire ring 164 disposed in an annular groove disposed in an exterior peripheral surface of the proximal piston portion 158 of the piston 121. The wire ring 164 protrudes radially outward to engage the proximal spring cap 162. With this configuration, a force that is applied to the piston 121 in the distal direction is transferred to the proximal spring cap 162 via the wire ring 164. Similarly, a force that is applied to the proximal spring cap 162 in the proximal direction is transferred to the piston 121 via the wire ring 164. In other example implementations, rather than using the wire ring 164, a protrusion can be formed on the exterior surface of the proximal piston portion 158 or a washer can be disposed thereon.

The first feedback spring 152 can have a first spring constant or spring rate $k_1$ and applies a biasing force on the solenoid actuator sleeve 142 in the distal direction. Similarly, the second feedback spring 154 can have a second spring rate $k_2$ and applies a biasing force in the distal direction on the slidable spring cap 156 interfacing with the first feedback spring 152.

With this configuration, the first feedback spring 152 and the second feedback spring 154 are disposed in series. Particularly, a force applied to the solenoid actuator sleeve 142 in the proximal direction is applied to each feedback spring 152, 154 without change of magnitude, and the amount of strain (deformation) or axial motion of the solenoid actuator sleeve 142 is the sum of the strains of the individual feedback springs 152, 154. Similarly, a force applied to the piston 121 in the distal direction is applied to each feedback spring 152, 154 without change of magnitude, and the extent of axial motion of the piston 121 is the sum of the strains of the individual feedback springs 152, 154.

Due to the feedback springs 152, 154 being in series, the combination of the first feedback spring 152 and the second feedback spring 154 has an equivalent or effective spring rate $k_{eq}$ that is less than the respective spring rate of either spring. Particularly, the effective spring rate $k_{eq}$ can be determined as $$\frac{k_1 k_2}{k_1 + k_2}.$$

The first feedback spring 152 and the second feedback spring 154 cooperate to apply a biasing force on the solenoid actuator sleeve 142 in the distal direction and cooperate to apply a biasing force on the piston 121 in the proximal direction. These biasing forces affect force balance between forces acting on the solenoid actuator sleeve 142 and forces acting on the piston 121, and thereby affect equilibrium axial position of the piston 121.

Specifically, based on the equivalent spring rate $k_{eq}$ of the feedback springs 152, 154 and their respective lengths, the feedback springs 152, 154 exert a particular preload or biasing force on the solenoid actuator sleeve 142 in the distal direction. The preload or biasing force causes the solenoid actuator sleeve 142 to be biased toward the neutral position or unactuated state shown in FIG. 1 where the annular groove 123 and the pilot cross-hole 118 are blocked by the solenoid actuator sleeve 142. When the pilot cross-hole 118 is blocked as shown in FIG. 1, the fluid at the third port 116 does not apply a fluid force on the piston 121 in the distal direction, and the piston 121 remains in the neutral position shown in FIG. 1 where it blocks fluid flow from the third port 116 to the second port 114.

To actuate the valve 100, an electric command signal can be sent from a controller of a hydraulic system to the solenoid coil 136. When an electrical current is provided through the windings of the solenoid coil 136 to actuate the valve 100, a magnetic field is generated. The pole piece 203 directs the magnetic field through the airgap 148 toward the armature 140, which is movable and is attracted toward the pole piece 203. In other words, when an electrical current is applied to the solenoid coil 136, the generated magnetic field forms a north and south pole in the pole piece 203 and the armature 140, and therefore the pole piece 203 and the armature 140 are attracted to each other. Because the pole piece 203 is fixed and the armature 140 is movable, the armature 140 can traverse the airgap 148 toward the pole piece 203, and the airgap 148 is reduced. As such, a solenoid force is applied on the armature 140, where the solenoid force is a pulling force that tends to pull the armature 140 in the proximal direction. The solenoid force is proportional to a magnitude of the electrical command signal (e.g., magnitude of electrical current or voltage applied to the solenoid coil 136).

FIG. 4A illustrates a cross-sectional side view of the valve 100 in a first actuated state, in accordance with an example implementation. The solenoid force applied to the armature 140 is also applied to the solenoid actuator sleeve 142, which is coupled to the armature 140 as described above with respect to FIG. 3. The solenoid actuator sleeve 142 in turn applies a compressive force in the proximal direction on the first feedback spring 152, which is thus compressed between the solenoid actuator sleeve 142 and the slidable spring cap 156. The slidable spring cap 156 in turn applies a compressive force in the proximal direction on the second feedback spring 154, which is thus compressed between the slidable spring cap 156 and the proximal spring cap 162.

The proximal spring cap 162 applies a force on the piston 121 via the wire ring 164. However, the piston 121 is precluded from moving in the proximal direction relative to the neutral position shown in FIG. 1 due to interaction between the protrusion 124 of the piston 121 and the shoulder 128 of the housing 108. As such, the solenoid force acts on the solenoid actuator sleeve 142 in the proximal direction against the effective biasing force that the feedback springs 152, 154 apply to solenoid actuator sleeve 142 in the distal direction.

As the command signal to the solenoid coil 136 increases, the solenoid force can overcome the effective biasing force of the feedback springs 152, 154 on the solenoid actuator sleeve 142, and the solenoid actuator sleeve 142 moves in the proximal direction. When the command signal to the solenoid coil 136 exceeds a predetermined threshold command (e.g., 20% of maximum voltage or current command), the feedback springs 152, 154 can be sufficiently compressed and the solenoid actuator sleeve 142 moves axially in the proximal direction to the actuated state shown in FIG. 4A.

As the solenoid actuator sleeve 142 starts to move past a distal edge of the annular groove 123, as depicted in FIG. 4A, the annular groove 123 and the pilot cross-hole 118 become partially unblocked (e.g., at least a portion of the annular groove 123 is exposed). Further, a pilot chamber 143 is formed as the solenoid actuator sleeve 142 moves proximally, where the pilot chamber 143 separates the solenoid actuator sleeve 142 from the piston 121. This way, the pilot chamber 143 becomes fluidly coupled to the third port 116 via the pilot cross-hole 118 and receives fluid from the third port 116.

FIG. 4B illustrates a partial cross-sectional back view of the valve 100, in accordance with an example implementation. Referring to FIGS. 4A-4B together, the piston 121 has an orifice 402 and a longitudinal channel 403 formed therein. As shown in FIG. 4B, the orifice 402 and the longitudinal channel 403 are offset laterally from the proximal piston portion 158. In other words, the orifice 402 and the longitudinal channel 403 are offset laterally from a central longitudinal axis of the piston 121. With this configuration, the orifice 402 is fluidly coupled to the pilot chamber 143.

Thus, with this configuration, referring back to FIG. 4A, as the solenoid actuator sleeve 142 moves past the distal edge of the annular groove 123, a pilot flow path is formed or opened. The pilot flow path includes (i) the pilot cross-hole 118, (ii) the annular groove 123, (iii) a flow restriction 405 comprising a partial opening of the annular groove 123, (iv) the pilot chamber 143, (v) the orifice 402, (vi) the longitudinal channel 403, and (vii) the main chamber 122. Thus, once the pilot flow path is formed or opened, pilot fluid can flow from the third port 116 through the pilot cross-hole 118 to the annular groove 123, through the flow restriction 405 to the pilot chamber 143, then through the orifice 402 and the longitudinal channel 403 to the main chamber 122, then to the first port 112, which can be fluidly coupled to a tank or reservoir. Such pilot fluid flow from the third port 116 to the first port 112 through the orifice 402 can be referred to as the pilot flow. As an example for illustration, the pilot flow can amount to about 0.15 gallons per minute (GPM).

The pilot flow through the flow restriction 405 causes a pressure drop in the pressure level of the fluid between the fluid at the third port 116 and the pilot chamber 143. For example, if pressure level at the third port 116 is 5000 psi, the pressure level within the pilot chamber 143 can be about 250 psi when the solenoid actuator sleeve 142 is in the position shown in FIG. 4A. The axial position of the solenoid actuator sleeve 142 determines an extent of the portion of annular groove 123 that is exposed, i.e., determines a size of the flow restriction 405. Larger axial movement of the solenoid actuator sleeve 142 in the proximal direction can increase the size of the flow restriction 405, and the pressure level in the pilot chamber 143 can responsively increase.

The pressurized fluid in the pilot chamber 143 applies a fluid force on an annular area 404 of the piston 121 in the distal direction. Further, the pressurized fluid in the pilot chamber 143 is communicated through the hole 160 of the solenoid actuator sleeve 142 and through unsealed spaces to the proximal end of the chamber 150 within the solenoid actuator sleeve 142. The pressurized fluid at the proximal end of the chamber 150 also applies a fluid force on the proximal end of the piston 121 in the distal direction. When the fluid forces acting on the piston 121 overcome the biasing force of the return spring 126, the piston 121 moves in the distal direction to an actuated position shown in FIG. 4A.

As the piston 121 moves in the distal direction to the actuated position, the piston cross-holes 129A, 129B become blocked as shown in FIG. 4A to preclude fluid flow from the second port 114 to the first port 112. In other words, the second port 114 becomes fluidly decoupled from the first port 112. The volume of the pilot chamber 143 increases as the solenoid actuator sleeve 142 moves in the proximal direction and the piston 121 moves in the distal direction.

Further, as the piston 121 moves in the distal direction, it applies a force via the wire ring 164 to the proximal spring cap 162, thereby applying a force on the second feedback spring 154. The second feedback spring 154 in turn applies a force on the slidable spring cap 156, which compresses the first feedback spring 152 as the slidable spring cap 156 slides on the exterior peripheral surface of the solenoid actuator sleeve 142.

In an example, the first feedback spring 152 can be softer than the second feedback spring 154. In other words, the spring rate $k_1$ of the first feedback spring 152 can be less than the spring rate $k_2$ of the second feedback spring 154. As an example for illustration, the spring rate $k_1$ can be about 22 pound-force per square inch (lbf/in) and the first feedback spring 152 can apply a biasing force of about 2 lbf, whereas the spring rate $k_2$ can be about 67 lbf/in and the second feedback spring 154 can apply a biasing force of about 10 lbf. In this example, as the piston 121 moves in the distal direction, the first feedback spring 152 being softer is compressed first, whereas the second feedback spring 154 remains substantially uncompressed or in other words the second feedback spring 154 can be compressed by less than a threshold, e.g., 1-2%, of its length.

The first feedback spring 152 is compressed until the slidable spring cap 156 reaches the interior distal end of the solenoid actuator sleeve 142 where it stops as shown in FIG. 4. This position can correspond to a threshold command signal value, e.g., 20% of maximum voltage or current command to the solenoid coil 136.

Further axial motion of the piston 121 in the distal direction causes the second feedback spring 154 to be compressed as well. As the feedback springs 152, 154 are compressed, the force that they apply to the piston 121 in the proximal direction (via the wire ring 164) increases because the force that a spring applies is equal to an amount of axial compression multiplied by its spring rate.

The axial position of the piston 121 in response to the command signal to the solenoid coil 136 is determined by or is based on a relationship (e.g., force equilibrium or force balance) between the various forces applied to the piston 121. Particularly, the feedback springs 152, 154 can be compressed until the force that they apply to the piston 121 in the proximal direction (in addition to a respective biasing force of the return spring 126 acting on the piston 121 in the proximal direction) balances the fluid force applied to the piston 121 in the distal direction. The term "balances" is used herein to indicate that the total force acting on the piston 121 in the proximal direction is equal in magnitude and is opposite in direction relative to the total force acting on the piston 121 in the distal direction.

As the command signal to the solenoid coil 136 increases, the solenoid force increases and the armature 140 as well as the solenoid actuator sleeve 142 move further in the proximal direction, thereby increasing a size of the opening of the flow restriction 405. As a result, the pressure drop through the flow restriction 405 decreases and the pressure level in the pilot chamber 143 increases. As the pressure level of fluid in the pilot chamber 143 increases, the fluid force that it applies to the piston 121 in the distal direction increases and the piston 121 moves further in the distal direction. As the piston 121 moves further in the distal direction, the feedback spring 152, 154 are compressed further, and the force they apply on the piston 121 in the proximal direction increases until it balances the fluid force acting on the piston 121 in the distal direction. Once such force balance or relationship between the forces is achieved, the piston 121 stops at a position that is substantially proportional to the command signal to the solenoid coil 136.

Figure 5:
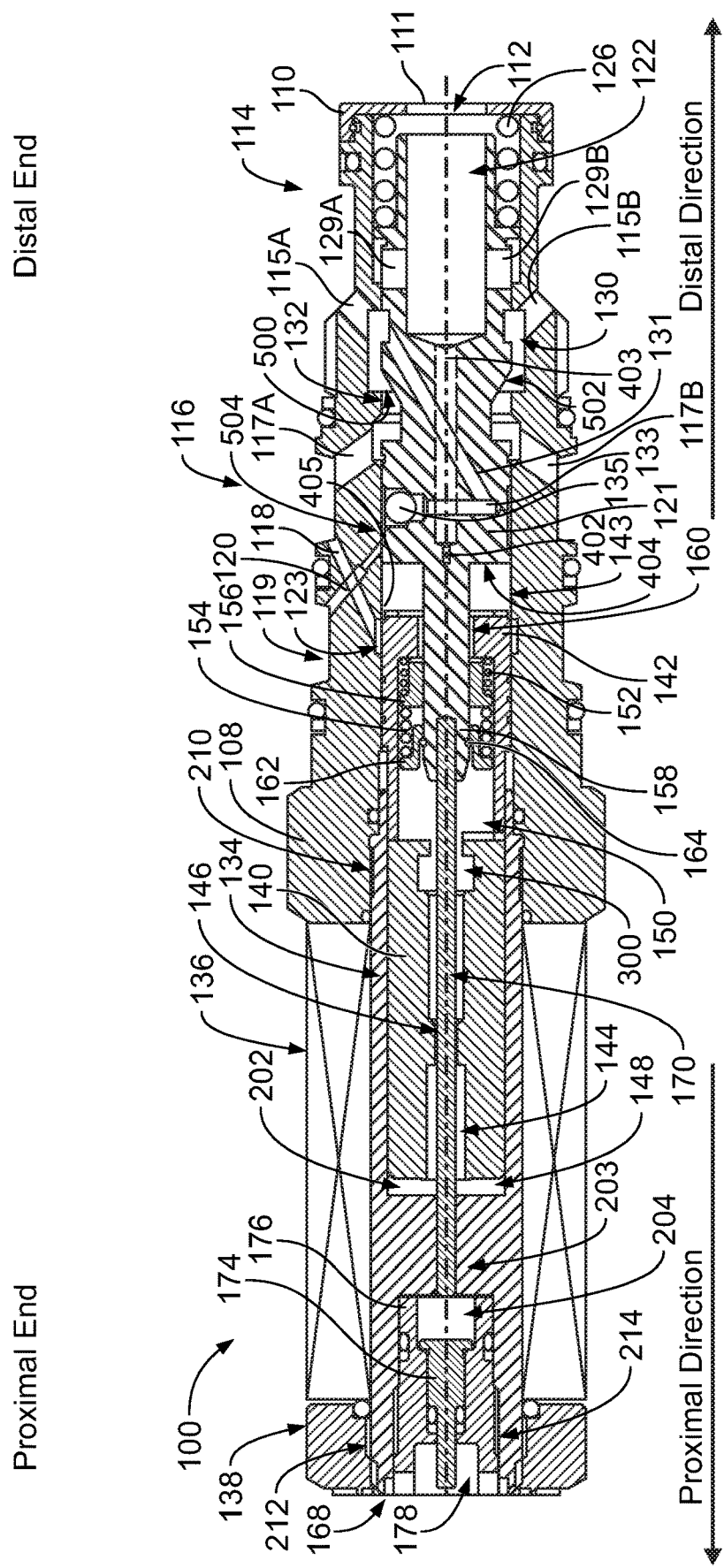
FIG. 5 illustrates a cross-sectional side view of a valve in a second actuated state, in accordance with an example implementation.

FIG. 5 illustrates a cross-sectional side view of the valve 100 in a second actuated state, in accordance with an example implementation. While the first actuated state depicted in FIG. 4A can correspond to a command signal that is about 20% of maximum voltage or current, the second actuated state depicted in FIG. 5 can correspond to a command signal that is about 80% of maximum voltage or current.

As depicted in FIG. 5, the higher command signal causes the piston 121 to move further in the distal direction (e.g., to the right in FIG. 5). As a result, the second feedback spring 154 is compressed until a new equilibrium position is reached. Particularly, the force that the second feedback spring 154 applies to the piston 121 in the proximal direction increases as it is compressed due to motion of the piston 121 in the distal direction. The force of the second feedback spring 154 increases until it balances the fluid force on the piston 121, and the piston 121 stops at a new equilibrium position shown in FIG. 5.

Further, as depicted in FIG. 5, further axial motion of the piston 121 in the distal direction causes an annular main flow area 500 to form between the exterior peripheral surface of the piston 121 and the protrusion 132 of the housing 108. In this position of the piston 121, a main flow path is formed through which fluid at the third port 116 is allowed to flow to the second port 114. Particularly, fluid at the third port 116 is allowed to flow through the inlet flow cross-holes 117A, 117B, then through the annular main flow area 500, the annular groove 130, and the actuator flow cross-holes 115A, 115B to the second port 114 and then to the actuator that can be fluidly coupled to the second port 114.

The annular main flow area 500 can increase in size as the piston 121 moves further in the distal direction and the second feedback spring 154 is compressed further relative to its state in FIG. 4A. The flow through the annular main flow area 500 can be referred to as the main flow. As an example for illustration, the main flow rate can amount to up to 25 GPM based on the axial position of the piston 121. The 25 GPM main flow rate is an example for illustration only. The valve 100 is scalable in size and different amounts of main flow rates can be achieved. Further, the exterior surface of the piston 121 can be made to have a sloped surface 502 at the annular main flow area 500. The slope angle of the sloped surface 502 can affect the flow rate through the annular main flow area 500 for a given axial position of the piston 121.

The slope angle of the sloped surface 502 can further affect a flow gain of the valve 100 as the piston 121 moves. The flow gain represents the magnitude of change in flow rate through the annular main flow area 500 per unit change in axial position of the piston 121. Thus, the angle of the sloped surface 502 can be changed so as to change capacity of the valve 100 (e.g., the maximum flow rate through the valve 100) and the flow gain of the valve 100.

As mentioned above, FIG. 4A illustrates the valve 100 in a first actuated state corresponding to a command of about 20% of maximum command, for example, and FIG. 5 illustrates the valve 100 in a second actuated state corresponding to a command of about 80% of maximum command, for example. A command signal between 20% and 80% proportionally corresponds to an axial position of the piston 121 that is between its position in FIG. 4A and its position in FIG. 5. As such, flow rate through the valve can be proportionally modulated by the command signal to the solenoid coil 136.

Further, as the main flow path is formed, a LS path is also formed and a LS fluid signal is generated. Particularly, the pressurized fluid provided to the second port 114 and to the actuator fluidly coupled thereto is also communicated to the fourth port 119 via the LS path. The LS path includes the first transversal channel 131, an annular groove 504 formed in an exterior peripheral surface of the piston 121, and the LS cross-hole 120. This way, a LS fluid signal is generated by fluid flowing through the first transversal channel 131, pushing the check element 135 and flowing around it, to the annular groove 504, through the LS cross-hole 120 to the fourth port 119.

Because the second port 114 can be fluidly coupled to a chamber of an actuator, the pressurized fluid provided to the second port 114 and also provided through the LS path to the fourth port 119 has a pressure level substantially equal to the pressure level of the fluid in the chamber of the actuator. Such pressure level can be indicative of a load that the actuator is subjected to. The fourth port 119 can be coupled to a LS port of a load-sensing pump so as to provide the LS fluid signal thereto and allow the pump to provide a flow output that has a pressure equal to the pressure level of the LS fluid signal (the pressure level of fluid provided to the actuator from the second port 114) plus a margin pressure setting. The flow output of the load-sensing pump is provided to the third port 116 and has a pressure level higher than the pressure level in the chamber of the actuator by the margin pressure setting so as to enable driving the actuator.

The configuration of the valve 100 offers several enhancements compared to conventional valve configurations. As mentioned above, the return spring 126 can be configured as a stiff spring (e.g., a spring that can cause a high force such as a force between 20 lbf and 80 lbf depending on a size of the valve 100). This way, when the command signal to the solenoid coil 136 is reduced or removed, the return spring 126 can push the piston 121 toward its unactuated position against the fluid force on the piston 121. The return spring 126 can also reduce hysteresis of the valve 100 by facilitating positioning the piston 121 at an axial position that is predictable based on the command signal to the solenoid coil 136. In other words, the return spring 126 reduces a lag between movement of the piston 121 and the change in the command signal to the solenoid coil 136. However, it should be understood that the valve 100 can be operable without the return spring 126.

Further, the valve 100 comprises a mechanical feedback configuration provided by the feedback springs 152, 154 such that a force equilibrium between the biasing force of the feedback springs 152, 154 acting on the piston 121 in the proximal direction and the fluid force acting on the piston 121 in the distal direction determines the equilibrium position of the piston 121. The equilibrium position of the piston 121 in turn determines the amount of flow rate through the valve 100. As such, an intermediate step of having to control a pilot pressure level by a pressure reducing valve to then control stroke of a directional valve, as used in conventional systems, can be eliminated.

Further, the piston 121 is not directly mechanically-coupled to the armature 140, and thus the stroke of the piston 121 can be different from the stroke of the armature 140. The stroke of the piston 121 is based on the spring rates of the feedback springs 152, 154 and the pressure level in the pilot chamber 143. With this configuration, the piston 121 can have a longer stroke compared to the stroke of the armature 140. For example, for a small axial stroke of the armature 140 (e.g., 0.021 inches) the stroke of the piston 121 can be between 0.16 and 0.2 inches, and thus flow control and flow resolution through the valve 100 can be enhanced. This contrasts with conventional valves having an armature directly acting on a movable element (e.g., a piston) such that the position of the armature is coupled to the position of the movable element, and thus the position of the movable element is limited by the magnitude of the solenoid force generated by the armature.

Further, in the flow modulation range of the valve 100 (e.g., command signal range between 20% and 80%), the armature 140 and the solenoid actuator sleeve 142 are acting mainly against the second feedback spring 154, which as mentioned above is a stiff spring. As such, an increase in the solenoid force by a corresponding increase in the command signal can lead to a small change in the stroke of the piston 121 due to stiffness of the second feedback spring 154. This way, flow resolution of the valve 100 is enhanced (i.e., change in the flow rate and position of the piston 121 is predictable and proportional to change in the command signal). In other words, the flow rate through the valve 100 can be smoothly controlled by varying the command signal to the solenoid coil 136.

At the same time, the valve 100 is configured such that the first feedback spring 152 has a lower stiffness compared to the second feedback spring 154. This configuration causes a smaller initial command (e.g., 20% of maximum command) to be sufficient to quickly compress the first feedback spring 152 to block flow from the second port 114 to the first port 112 and position the valve 100 in a state where modulation of the flow from the third port 116 to the second port 114 can begin.

Further, the valve 100 is configured to internally generate a LS fluid signal that can be provided to drive a load-sensing pump. This configuration can save cost and enhance reliability because no external hydraulic connection is needed to tap into a hydraulic line connecting the second port 114 to the actuator. Rather, the LS fluid signal is generated internally within the valve 100 and provided to the pump.

Also, the preload of the feedback springs 152, 154 allows the valve 100 to have a dead band or a dead zone such that a command signal that is larger than zero (e.g., command signal of about 20% of maximum command) places the valve 100 in a state that where flow can be modulated from the third port 116 to the second port 114. With this configuration, if the controller of the valve 100 is not well-calibrated and produces a few milliamps of current without a command signal being sent thereto, the valve 100 is not actuated, thus rendering the valve 100 safer to operate. It should be understood, however, that in other example configurations of the valve 100, the feedback springs 152, 154 can be replaced by a single equivalent feedback spring, and the slidable spring cap 156 can be eliminated.

In some applications, it may be desirable to have a manual override actuator coupled to the valve 100 so as to allow the valve 100 to be manually actuated to place a machine in a safe condition, for example, if the solenoid actuator 106 malfunctions. Actuating the valve 100 using the manual override actuator can place the valve 100 in the actuated state shown in FIG. 5, for example, thereby allowing for fluid at the third port 116 (e.g., from a pump) to be communicated to the second port 114, and then to the actuator so as to place the actuator in a safe condition.

Referring to FIG. 1, the valve 100 includes a manual override actuator 168 configured to allow for actuating or opening the valve 100 if the solenoid actuator 106 malfunctions. The manual override actuator 168 includes a pin 170 disposed through the channel 205. The pin 170 is disposed through a blind-hole formed at a proximal end of the proximal piston portion 158 of the piston 121. With this configuration, movement of the pin 170 can cause the piston 121 to move, thereby opening the main flow path and fluidly coupling the third port 116 to the second port 114.

The manual override actuator 168 includes a manual override piston 174 that interfaces with or contacts the pin 170, such that longitudinal or axial motion of the manual override piston 174 in the distal direction causes the pin 170 and the piston 121 coupled thereto to move axially therewith. The manual override piston 174 can be guided within a nut 176. The nut 176 in turn is threadedly coupled to the solenoid tube 134 at the threaded region 214.

The manual override piston 174 is axially movable within the second chamber 204 of the solenoid tube 134. For instance, if the manual override piston 174 is pushed in the distal direction, e.g., by an operator, the manual override piston 174 moves in the distal direction (e.g., to the right in FIG. 1). If the manual override piston 174 is released, the feedback springs 152, 154 can push back the piston 121, the pin 170, and the manual override piston 174 in the proximal direction to close the valve 100.

In other example implementations, rather than having the manual override actuator 168 in the second chamber 204, a position sensor can be included therein. For example, the pin 170 can be coupled to a position sensor such that movement of the pin 170 is converted to a position signal that can be provided to a controller of a hydraulic system that includes the valve 100. The position signal can be indicative of the axial position of the piston 121. Thus, the controller can determine the axial position of the piston 121 and adjust the command signal to the solenoid coil 136 accordingly.

As a particular example, the valve 100 can include a Linear Variable Differential Transformer (LVDT) or other type of electromechanical transducer that can convert the rectilinear motion of the pin 170 and the piston 121 into a corresponding electrical signal. In this example, the pin 170 can be made of a magnetically permeable material, and the LVDT can include primary and secondary coils disposed in the second chamber 204. The primary coil can be disposed at the center of the LVDT, whereas two secondary coils are wound symmetrically on each side of the primary coil or on top of the primary coil. The coils can be wound on a one-piece hollow form to allow the pin 170 to move axially within the space inside the coils. In operation, the LVDT's primary coil can be energized by alternating current of appropriate amplitude and frequency, known as the primary excitation. The LVDT's electrical output signal is the differential AC voltage between the two secondary coils, which varies with the axial position of the pin 170 within the coils. The AC output voltage can be converted by suitable electronic circuitry to high level DC voltage or current that is then provided to the controller.

An LVDT is used herein as an example for illustration. Other types of position sensors can be used including a capacitive transduce, a capacitive displacement sensor, an Eddy-current sensor, an ultrasonic sensor, a grating sensor, a Hall-Effect sensor, an inductive non-contact position sensor, or an anisotropic magneto-resistive sensor as examples.

Figure 6:
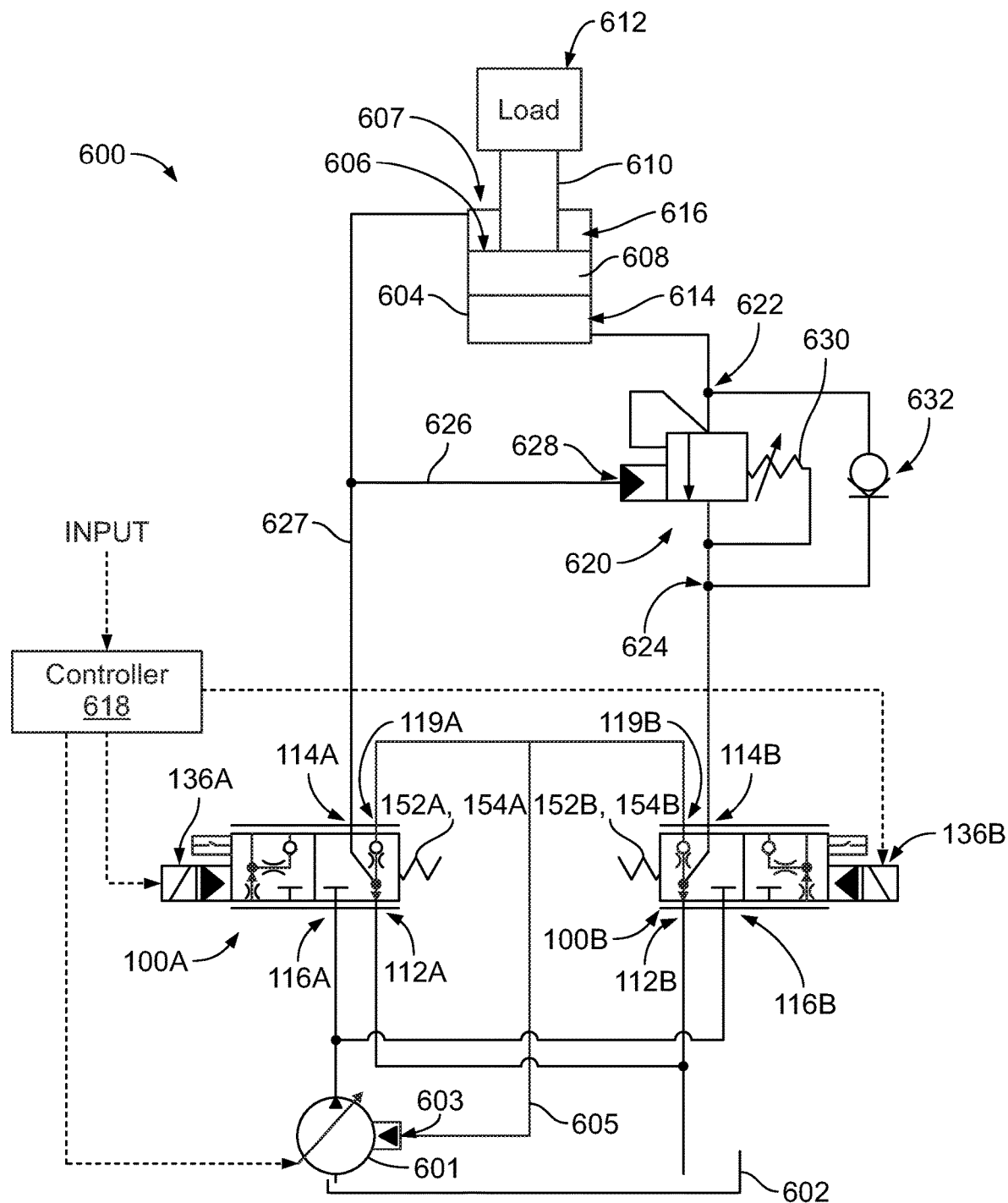
FIG. 6 illustrates a hydraulic system, in accordance with an example implementation.

FIG. 6 illustrates a hydraulic system 600, in accordance with an example implementation. The hydraulic system 600 includes two valves 100A, 100B that each symbolically represents the valve 100. The valves 100A, 100B have the same components of the valve 100. Therefore, the components or elements of the valves 100A, 100B are designated with the same reference numbers used for the valve 100 with an "A" or "B" suffix to correspond to the valves 100A, 100B respectively.

The hydraulic system 600 includes a source of fluid such as a load-sensing variable displacement pump 601. The third ports 116A, 116B of the valves 100A, 100B, respectively, are fluidly coupled to an outlet of the load-sensing variable displacement pump 601 such that the load-sensing variable displacement pump 601 provides fluid flow from the outlet to the third ports 116A, 116B. The hydraulic system 600 also includes a reservoir or tank 602 of fluid that can store fluid at a low pressure (e.g., 0-70 psi). The first ports 112A, 112B of the valves 100A, 100B are respectively fluidly coupled to the tank 602.

The load-sensing variable displacement pump 601 can be configured to receive fluid from the tank 602, pressurize the fluid, then provide pressurized fluid to the third ports 116A, 116B of the valves 100A, 100B. Pressure level of the fluid provided by the load-sensing variable displacement pump 601 to the third ports 116A, 116B is based on pressure level of a LS fluid signal received at LS port 603 of the load-sensing variable displacement pump 601. The LS fluid signal is received at the LS port 603 via LS hydraulic line 605, which is fluidly coupled to the fourth ports 119A, 119B of the valves 100A, 100B. The load-sensing variable displacement pump 601 provides a flow output to the third ports 116A, 116B, with the flow output having a pressure level equal to the pressure level of the LS fluid signal plus a margin pressure setting.

The valves 100A, 100B are configured as meter-in valves configured to control fluid flow to and from an actuator 607. The actuator 607 includes a cylinder 604 and an actuator piston 606 slidably accommodated in the cylinder 604. The actuator piston 606 includes a piston head 608 and a rod 610 extending from the piston head 608 along a central longitudinal axis direction of the cylinder 604. The rod 610 is coupled to a load 612. The load 612 is depicted as a block and represents any type of load that the actuator 607 can be subjected to.

The piston head 608 divides the inner space of the cylinder 604 into a first chamber 614 and a second chamber 616. The second port 114A of the valve 100A is fluidly coupled to the second chamber 616, whereas the second port 114B of the valve 100B can be fluidly coupled to the first chamber 614.

The hydraulic system 600 can include a controller 618. The controller 618 can include one or more processors or microprocessors and may include data storage (e.g., memory, transitory computer-readable medium, non-transitory computer-readable medium, etc.). The data storage may have stored thereon instructions that, when executed by the one or more processors of the controller 618, cause the controller 618 to perform operations described herein. Signal lines to and from the controller 618 are depicted as dashed lines in FIG. 6. The controller 618 can receive input or input information comprising sensor information via signals from various sensors or input devices in the hydraulic system 600, and in response provide electrical signals to various components of the hydraulic system 600 such as the solenoid coils 136A, 136B and the load-sensing variable displacement pump 601.

For example, the controller 618 can receive a command or input information requesting retracting the actuator piston 606. The controller 618 can then send a signal to the solenoid coil 136A of the valve 100A. As a result, the armature 140 and the solenoid actuator sleeve 142 of the valve 100A can move in the proximal direction against the biasing forces of the feedback springs 152A, 154A (represented symbolically as a single equivalent spring in FIG. 6) and a pilot flow path can be opened from the third port 116A to the first port 112A similar to the description above with respect to FIG. 4A. Particularly, pilot fluid can flow from the third port 116A through the pilot cross-hole 118 to the pilot chamber 143, then through the orifice 402 and the longitudinal channel 403 to the main chamber 122, then to the first port 112A.

As described above with respect to FIGS. 4A-5, the pressurized fluid in the pilot chamber 143 applies a fluid force on the piston 121 in the distal direction, thereby causing the piston 121 to move axially in the distal direction against the biasing forces of the feedback springs 152A, 154A. As a result, the piston 121 blocks fluid flow path from the second port 114A to the first port 112A, and another fluid flow path opens from the third port 116A to the second port 114A, e.g., through the inlet flow cross-holes 117A, 117B, the annular main flow area 500, and the actuator flow cross-holes 115A, 115B. The fluid then flows from the second port 114A to the second chamber 616 of the actuator 607, thereby applying a force on the actuator piston 606 causing the actuator piston 606 to retract (e.g., move downward in FIG. 6).

At the same time, a LS fluid signal indicative of the pressure level in the second chamber 616 (and thus indicative of the load 612) is provided via the fourth port 119A and the LS hydraulic line 605 to the LS port 603 of the load-sensing variable displacement pump 601. The load-sensing variable displacement pump 601 then provides fluid flow to the third port 116A, where the pressure level of the fluid is equal to the pressure level of the LS fluid signal plus the margin pressure setting.

The magnitude of the annular main flow area 500 is based on the extent of axial motion of the piston 121 in the distal direction. As described above with respect to FIGS. 4A-5, the axial position of the piston 121 is determined based on a force balance or relationship between the fluid force acting in the distal direction on the piston 121 and the spring forces of the feedback springs 152A, 154A acting on the piston 121 in the proximal direction. The magnitude of the spring forces is determined based on the magnitude of the solenoid force which pulls the armature 140 and the solenoid actuator sleeve 142 in the proximal direction to compress the feedback springs 152A, 154A. The spring forces can be determined as a multiplication of the amount of axial compression of the feedback springs 152A, 154A by their respective spring rates. The magnitude of the solenoid force in turn is based on the magnitude of the command signal from the controller 618 to the solenoid coil 136A.

Thus, by providing a command signal having a particular command signal to the solenoid coil 136A of the valve 100A, a proportional amount of fluid is provided from the load-sensing variable displacement pump 601 to the second chamber 616. Thus, the valve 100A meters-in a particular desired amount of fluid flow to move the actuator piston 606 at a particular speed based on the magnitude of the command signal from the controller 618. As the actuator piston 606 retracts to lower the load 612, fluid is forced out of the first chamber 614. To avoid uncontrollable lowering of the load 612 and cavitation in the second chamber 616, a counterbalance valve 620 can be installed in the hydraulic line connecting the first chamber 614 to the valve 100B. The counterbalance valve 620 is configured to control or restrict fluid forced out of the first chamber 614. When the counterbalance valve 620 is actuated, fluid forced out of the first chamber 614 can flow to a load port 622 of the counterbalance valve 620, then through a restriction formed within the counterbalance valve 620, then to a port 624 that is fluidly coupled to the second port 114B of the valve 100B.

A pilot line 626 tapped from a hydraulic line 627 connecting the valve 100A to the second chamber 616 is fluidly coupled to a pilot port 628 of the counterbalance valve 620. A pilot pressure fluid signal received through the pilot line 626 acts together with the pressure induced in the first chamber 614 due to the load 612, against a force generated by a setting spring 630 of the counterbalance valve 620. The combined action of the pilot pressure fluid signal and the induced pressure in the first chamber 614 facilitates opening the counterbalance valve 620 and forming the restriction therein to allow flow therethrough. If the actuator piston 606 tends to increase its speed, pressure level in the second chamber 616 and the pilot line 626 may decrease. As a result, the counterbalance valve 620 restricts fluid flow therethrough to preclude the load 612 from dropping at large speeds (i.e., precludes the load 612 from overrunning).

The valve 100B can be in an unactuated state (e.g., the state shown in FIG. 1) where fluid is allowed to freely flow (e.g., with minimal pressure drop) from the second port 114B to the first port 112B, which is fluidly coupled to the tank 602. With this configuration, meter-in fluid flow is controlled via the valve 100A independently from meter-out flow through the valve 100B. Beneficially, the reduced or minimized pressure drop through the valve 100B reduces power consumption in the hydraulic system 600.

The configuration of FIG. 6 offers several enhancements over conventional hydraulic systems having a spool valve controlled by a pressure reducing valve. The construction of the spool valve is such that a given position of the spool determines the meter-in and meter-out restriction sizes at the same time. Thus, metering-in and metering-out are coupled and the valve has one degree of freedom, and can control either the speed of the actuator piston 606 or the pressure in just one of the chambers 614, 616 but not both. Thus, it can provide for speed control but it cannot achieve efficient operation at the same time.

Further, in the case of an overrunning load, which happens when lowering the load 612 with gravity assistance, for example, spool valves are designed such that the outlet restriction is used to control the flow so as to prevent the load from falling at uncontrollable speeds. However, in other operating conditions, such as lifting the load 612, this restriction is not needed yet it is inherent in the design of the spool valve and causes energy loss.

Further, some spool valves are actuated via a pilot fluid signal. A pressure reducing valve is added to the system and is configured to receive fluid from the pump and reduce its pressure level before providing the pilot signal fluid having the reduced pressure level to the spool valve to move its spool. Having such a pressure reducing valve can increase the cost of the hydraulic system. Further, such a hydraulic system involves first reducing pressure level then controlling a stroke of the spool of the spool valve. Such configuration can lead to poor resolution and poor proportionality between a command signal to the pressure reducing valve and a position of the spool of the spool valve.

With the configuration of FIG. 6, however, the meter-out fluid flows through the valve 100B which is independent from the valve 100A. The valve 100B can be in an unactuated state, and thus remains fully open from the second port 114B to the first port 112B regardless of the command signal provided to the valve 100A. Meter-out flow can thus be controlled by the counterbalance valve 620. Beneficially, because the valve 100B can be fully open, the counterbalance valve 620 need not be a vented type counterbalance valve, which is a more expensive type of counterbalance valves. Further, as described above, the mechanical force feedback that determines the axial position of the piston 121 within the valve 100A offers enhanced, higher resolution flow control through the valve 100A compared to a configuration where a pressure reducing valve controls a pilot pressure level that actuates a spool valve.

Further, because the valve 100B is unactuated, no LS fluid signal is provided to the fourth port 119B of the valve 100B; rather, the LS fluid signal is provided from the fourth port 119A of the valve 100A, which is actuated. This way, in the case of an overrunning load where pressure level in the first chamber 614 is higher than the pressure level in the second chamber 616, the load-sensing variable displacement pump 601 provides fluid flow to the third port 116A with a reduced pressure level that is sufficient to drive lower the load 612 without consuming the higher power that would have been required if the LS fluid signal is provided from the valve 100B to indicate pressure level in the first chamber 614.

The controller 618 can also receive a command or input information requesting extending the actuator piston 606. The controller 618 can then send a signal to the solenoid coil 136B of the valve 100B. As a result, the armature 140 and the solenoid actuator sleeve 142 of the valve 100B can move in the proximal direction against the biasing forces of the feedback springs 152B, 154B (represented symbolically as a single equivalent spring in FIG. 6) and a pilot flow path can be opened from the third port 116B to the first port 112B similar to the description above with respect to FIG. 4A. Particularly, pilot fluid can flow from the third port 116B through the pilot cross-hole 118 to the pilot chamber 143, then through the orifice 402 and the longitudinal channel 403 to the main chamber 122, then to the first port 112B.

The pressurized fluid in the pilot chamber 143 applies a fluid force on the piston 121 of the valve 100B in the distal direction, thereby causing the piston 121 to move axially in the distal direction against the biasing forces of the feedback springs 152B, 154B. As a result, the piston 121 blocks fluid flow path from the second port 114B to the first port 112B, and another fluid flow path opens from the third port 116B to the second port 114B, e.g., through the inlet flow cross-holes 117A, 117B, the annular main flow area 500, and the actuator flow cross-holes 115A, 115B.

At the same time, a LS fluid signal indicative of the pressure level in the first chamber 614 (and thus indicative of the load 612) is provided via the fourth port 119B and the LS hydraulic line 605 to the LS port 603 of the load-sensing variable displacement pump 601. The load-sensing variable displacement pump 601 then provides fluid flow to the third port 116B, where the pressure level of the fluid is equal to the pressure level of the LS fluid signal plus the margin pressure setting.

The counterbalance valve 620 is configured to allow fluid flow through a free-flow check valve 632 from the second port 114B of the valve 100B to the first chamber 614. The actuator piston 606 can then extend (e.g., move upward in FIG. 6) and fluid is forced out of the second chamber 616 through the hydraulic line 627 toward the second port 114A of the valve 100A. The valve 100A can be in an unactuated state to allow fluid to flow freely (i.e., with minimal pressure drop) from the second port 114A to the first port 112A, and then to the tank 602. Beneficially, the reduced or minimized pressure drop through the valve 100A reduces power consumption in the hydraulic system 600.

FIG. 7 is a flowchart of a method 700 for operating a valve, in accordance with an example implementation. The method 700 shown in FIG. 7 presents an example of a method that can be used with the valve 100 shown throughout the Figures, for example. The method 700 may include one or more operations, functions, or actions as illustrated by one or more of blocks 702-708. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 702, the method 700 includes operating the valve 100 in a first state, where the first port 112 of the valve 100 is fluidly coupled to the second port 114 of the valve 100 such that fluid is allowed to flow from the second port 114 to the first port 112 as shown in FIG. 1.

At block 704, the method 700 includes receiving an electric signal (e.g., from the controller 618) energizing the solenoid coil 136 of the solenoid actuator 106 of the valve 100 to operate the valve 100 in a second state (e.g., the state shown in FIG. 4A or 5).

At block 706, the method 700 includes, responsively, causing the armature 140 and the solenoid actuator sleeve 142 coupled thereto to move, thereby (i) compressing the first feedback spring 152 and the second feedback spring 154 disposed in series with the first feedback spring 152 to increase biasing force applied by the first feedback spring 152 and the second feedback spring 154 on the piston 121 of the valve 100 in a proximal direction, and (ii) opening a pilot flow path to allow pilot fluid to flow from the third port 116 of the valve 100 to the first port 112, wherein the pilot fluid applies a fluid force on the piston 121 in the distal direction, and wherein the piston 121 moves to a particular axial position determined by a relationship between the fluid force and the biasing force.

At block 708, the method 700 includes, in response to motion of the piston 121 to the particular axial position: (i) opening a main flow path from the third port 116 to the second port 114 while blocking fluid path from the second port 114 to the first port 112, and (ii) opening a LS path from the second port 114 to the fourth port 119 to provide a LS fluid signal thereto.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve comprising:
   a housing comprising: (i) a first port, (ii) a second port, (iii) a third port, wherein the third port comprises a pilot cross-hole and an inlet flow cross-hole, and (iv) a fourth port;
   a piston disposed in the housing and axially movable between a neutral position and an actuated position, wherein the piston is configured to allow a load-sense (LS) fluid signal to be provided from the second port to the fourth port through the piston, and wherein in the neutral position: (i) the second port is fluidly coupled to the first port, and (ii) the inlet flow cross-hole of the third port is fluidly decoupled from the second port;
   a solenoid actuator sleeve comprising a chamber therein, wherein the solenoid actuator sleeve is axially movable between an unactuated state and an actuated state, wherein in the unactuated state, the solenoid actuator sleeve blocks the pilot cross-hole of the third port, and in the actuated state, the solenoid actuator sleeve is configured to allow the pilot cross-hole to be fluidly coupled to the first port and allow pilot fluid to apply a fluid force on the piston in a distal direction;
   a first feedback spring disposed in the chamber within the solenoid actuator sleeve; and
   a second feedback spring disposed in series with the first feedback spring in the chamber within the solenoid actuator sleeve, wherein the first feedback spring and the second feedback spring cooperate to apply a biasing force in a proximal direction on the piston against the fluid force, wherein the piston is configured to move axially to the actuated position based on a relationship between the fluid force and the biasing force, and wherein in the actuated position the inlet flow cross-hole is fluidly coupled to the second port whereas the second port is fluidly decoupled from the first port.

2. The valve of claim 1, wherein the piston includes one or more transverse channels formed therein, wherein the one or more transverse channels fluidly couple the second port to the fourth port so as to provide the LS fluid signal from the second port to the fourth port therethrough.

3. The valve of claim 2, wherein the one or more transverse channels comprise a first transverse channel and a second transverse channel, and wherein the valve further comprises:

a check element disposed in the first transverse channel or the second transverse channel so as to allows the LS fluid signal to flow from the second port to the fourth port, while blocking fluid flow from the fourth port to the second port.

4. The valve of claim 1, wherein the piston comprises a proximal piston portion disposed within the chamber of the solenoid actuator sleeve, and wherein the first feedback spring and the second feedback spring cooperate to apply the biasing force in the proximal direction on the proximal piston portion of the piston.

5. The valve of claim 4, further comprising:
a slidable spring cap that is slidably accommodated about an exterior peripheral surface of the proximal piston portion, wherein a proximal end of the first feedback spring rests against the slidable spring cap, whereas a distal end of the first feedback spring rests against an interior surface of the solenoid actuator sleeve; and
a proximal spring cap coupled to the proximal piston portion, wherein a proximal end of the second feedback spring rests against the proximal spring cap, whereas a distal end of the second feedback spring rests against the slidable spring cap.

6. The valve of claim 1, further comprising:
a pilot chamber formed within the housing between the solenoid actuator sleeve and the piston, wherein the pilot fluid is communicated from the pilot cross-hole to the pilot chamber to apply the fluid force on the piston in the distal direction.

7. The valve of claim 6, wherein the piston comprises a main chamber therein, wherein the main chamber is fluidly coupled to the first port, wherein the piston comprises an orifice and a longitudinal channel formed therein, wherein the orifice and the longitudinal channel are offset laterally from a central longitudinal axis of the piston.

8. The valve of claim 7, wherein as the solenoid actuator sleeve moves axially to the actuated state, a pilot flow path is formed to allow pilot fluid flow from the third port through the pilot cross-hole, the pilot chamber, the orifice, the longitudinal channel, and the main chamber to the first port.

9. The valve of claim 1, further comprising:
a return spring disposed about an exterior peripheral surface of the piston and configured to apply a respective biasing force on the piston in the proximal direction toward the neutral position, wherein the actuated position of the piston is an equilibrium position that is based on a respective relationship between: (i) the fluid force acting on the piston in the distal direction, and (ii) the respective biasing force of the return spring and the biasing force of the first feedback spring and the second feedbacks spring acting on the piston in the proximal direction.

10. The valve of claim 1, further comprising:
a solenoid actuator comprising a solenoid coil, a pole piece, and an armature that is mechanically coupled to the solenoid actuator sleeve, wherein when the solenoid coil is energized, the armature and the solenoid actuator sleeve coupled thereto move axially in the proximal direction toward the pole piece, thereby compressing the first feedback spring and the second feedback spring.

11. The valve of claim 10, wherein the solenoid actuator further comprises a solenoid tube, and wherein the solenoid tube comprises: (i) a cylindrical body, (ii) a first chamber defined within the cylindrical body and configured to receive the armature of the solenoid actuator therein, and (iii) a second chamber defined within the cylindrical body, wherein the pole piece is formed as a protrusion within the cylindrical body, wherein the pole piece is disposed between the first chamber and the second chamber, and wherein the pole piece defines a channel therethrough, such that the channel of the pole piece fluidly couples the first chamber to the second chamber.

12. The valve of claim 11, further comprising:
a manual override actuator having: (i) a manual override piston disposed, at least partially, in the second chamber of the solenoid tube, and (ii) a pin disposed through the channel of the pole piece and through the armature, wherein a proximal end of the pin contacts the manual override piston and a distal end of the pin is coupled to the piston, wherein axial motion of the manual override piston causes the pin and the piston to move axially, thereby manually moving the piston to the actuated position.

13. The valve of claim 1, wherein the piston comprises a piston cross-hole, and wherein in the neutral position the second port is fluidly coupled to the first port via the piston cross-hole, and wherein in the actuated position, the piston cross-hole is blocked such that the second port is fluidly decoupled from the first port.

14. A hydraulic system comprising:
a load-sensing pump having a load-sense (LS) port and an outlet for providing fluid therefrom;
a tank;
an actuator; and
a valve having (i) a first port fluidly coupled to the tank, (ii) a second port fluidly coupled to the actuator, (iii) a third port fluidly coupled to the outlet of the load-sensing pump, wherein the third port comprises a pilot cross-hole and an inlet flow cross-hole, and (iv) a fourth port fluidly coupled to the LS port of the load-sensing pump, and wherein the valve comprises:
a piston that is axially movable between a neutral position and an actuated position, wherein the piston is configured to allow a LS fluid signal to be provided from the second port to the fourth port through the piston, wherein in the neutral position: (i) the second port is fluidly coupled to the first port, and (ii) the inlet flow cross-hole of the third port is fluidly decoupled from the second port,
a solenoid actuator sleeve that is axially movable between an unactuated state and an actuated state, wherein in the unactuated state, the solenoid actuator sleeve blocks the pilot cross-hole of the third port, and in the actuated state, the solenoid actuator sleeve is configured to allow the pilot cross-hole to be fluidly coupled to the first port and allow pilot fluid to apply a fluid force on the piston in a distal direction,
a first feedback spring, and
a second feedback spring disposed in series with the first feedback spring, wherein the first feedback spring and the second feedback spring cooperate to apply a biasing force in a proximal direction on the piston against the fluid force, wherein the piston is configured to move axially to the actuated position based on a relationship between the fluid force and the biasing force, and wherein in the actuated position, the inlet flow cross-hole is fluidly coupled to the second port whereas the second port is fluidly decoupled from the first port.

15. The hydraulic system of claim 14, wherein the actuator comprises a first chamber and a second chamber, wherein the second port of the valve is fluidly coupled to the second chamber of the actuator, wherein the valve is a first valve, and wherein the hydraulic system includes a second valve having (i) a respective first port fluidly coupled to the tank, (ii) a respective second port fluidly coupled to the first chamber of the actuator, (iii) a respective third port fluidly coupled to the load-sensing pump, and (iv) a respective fourth port fluidly coupled to the LS port of the load-sensing pump.

16. The hydraulic system of claim 15, further comprising:
a counterbalance valve having: (i) a load port fluidly coupled to the first chamber of the actuator, (ii) a pilot port fluidly coupled to a hydraulic line connecting the second port of the first valve to the second chamber of the actuator, and (iii) a port fluidly coupled to the respective second port of the second valve.

17. The hydraulic system of claim 16, wherein the counterbalance valve comprises a free-flow check valve configured to allow fluid flow from the respective second port of the second valve to the first chamber of the actuator when the second valve is actuated.

18. A method comprising:
operating a valve in a first state, wherein a first port of the valve is fluidly coupled to a second port of the valve such that fluid is allowed to flow from the second port to the first port;
receiving an electric signal energizing a solenoid coil of a solenoid actuator of the valve to operate the valve in a second state;
responsively, causing an armature and a solenoid actuator sleeve coupled thereto to move, thereby (i) compressing a first feedback spring and a second feedback spring disposed in series with the first feedback spring to increase a biasing force applied by the first feedback spring and the second feedback spring on a piston of the valve in a proximal direction, and (ii) opening a pilot flow path to allow pilot fluid to flow from a third port of the valve to the first port, wherein the pilot fluid applies a fluid force on the piston in a distal direction, and wherein the piston moves to a particular axial position determined by a relationship between the fluid force and the biasing force; and
in response to motion of the piston to the particular axial position, (i) opening a main flow path from the third port to the second port while blocking fluid path from the second port to the first port, and (ii) opening a load-sense path from the second port to a fourth port of the valve to provide a load-sense signal thereto.

19. The method of claim 18, wherein the valve comprises: (i) a slidable spring cap that is slidably accommodated about an exterior peripheral surface of the piston, wherein a proximal end of the first feedback spring rests against the slidable spring cap, whereas a distal end of the first feedback spring rests against an interior surface of the solenoid actuator sleeve, and (ii) a proximal spring cap coupled to the piston, wherein a proximal end of the second feedback spring rests against the proximal spring cap, whereas a distal end of the second feedback spring rests against the slidable spring cap, and wherein:
causing the solenoid actuator sleeve to move comprises compressing the first feedback spring until the slidable spring cap contacts the solenoid actuator sleeve, then compressing the second feedback spring.

20. The method of claim 18, wherein the valve comprises: a manual override actuator having a manual override piston and a pin, wherein a proximal end of the pin contacts the manual override piston and a distal end of the pin is coupled to the piston of the valve, the method further comprising:
moving the manual override piston axially, thereby causing the pin and the piston to move axially, thereby opening the main flow path.

* * * * *